US008533831B2

(12) United States Patent
Satish

(10) Patent No.: US 8,533,831 B2
(45) Date of Patent: Sep. 10, 2013

(54) SYSTEMS AND METHODS FOR ALTERNATING MALWARE CLASSIFIERS IN AN ATTEMPT TO FRUSTRATE BRUTE-FORCE MALWARE TESTING

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 539 days.

(21) Appl. No.: 12/830,084

(22) Filed: Jul. 2, 2010

(65) Prior Publication Data

US 2012/0005750 A1    Jan. 5, 2012

(51) Int. Cl.
 *G06F 21/00* (2006.01)
(52) U.S. Cl.
 USPC .............. 726/23; 726/22; 726/24; 713/154; 713/188
(58) Field of Classification Search
 USPC .............................. 726/22–25; 713/154, 188
 See application file for complete search history.

(56) References Cited

U.S. PATENT DOCUMENTS

| | | | |
|---|---|---|---|
| 6,357,008 B1 | 3/2002 | Nachenberg | |
| 7,519,668 B2 * | 4/2009 | Goodman et al. | 709/206 |
| 2005/0015454 A1 | 1/2005 | Goodman et al. | |
| 2006/0242684 A1 * | 10/2006 | Russell et al. | 726/1 |
| 2009/0013405 A1 * | 1/2009 | Schipka | 726/22 |

OTHER PUBLICATIONS

International Search Report from related International Application No. PCT/US2011/036560; Jul. 29, 2011.
Written Opinion of the International Searching Authority from related International Application No. PCT/US2011/036560; Jul. 29, 2011.
Matthas Jacob et al; The Superdiversifier: Peephole Individualization for Software Protection; Nov. 25, 2008.

* cited by examiner

*Primary Examiner* — Andrew L Nalven
*Assistant Examiner* — Amir Mehrmanesh
(74) *Attorney, Agent, or Firm* — ALG Intellectual Property, LLC

(57) ABSTRACT

A computer-implemented method for alternating malware classifiers in an attempt to frustrate brute-force malware testing may include (1) providing a group of heuristic-based classifiers for detecting malware, wherein each classifier within the group differs from all other classifiers within the group but has an accuracy rate that is substantially similar to all other classifiers within the group, (2) including the group of classifiers within a security-software product, and (3) alternating the security-software product's use of the classifiers within the group in an attempt to frustrate brute-force malware testing by (a) randomly selecting and activating an initial classifier from within the group and then, upon completion of a select interval, (b) replacing the initial classifier with an additional classifier randomly selected from within the group. Various other methods, systems, and computer-readable media are also disclosed.

17 Claims, 6 Drawing Sheets

SYSTEMS AND METHODS FOR ALTERNATING MALWARE CLASSIFIERS IN AN ATTEMPT TO FRUSTRATE BRUTE-FORCE MALWARE TESTING

BACKGROUND

Anti-malware solutions often implement heuristic-based detection technologies that are capable of detecting malware for which a malware signature is unavailable. In particular, instead of comparing a file against a signature set, such heuristic-based detection technologies may be programmed to analyze various features of a file in order to determine whether the file contains malware. For example, heuristic-based detection technologies may be programmed to evaluate the file size, the file name, the file location, and/or the file extension of each file encountered during a malware scan in order to determine whether any of the files encountered contain malware.

While heuristic-based detection technologies may provide broader detection capabilities than signature-based detection technologies, malware authors may still be capable of modifying malware to become undetectable to these heuristic-based detection technologies. For example, a malware author may modify the file size, the file name, the file location, and/or the file extension of a malicious file until the file becomes undetectable to the heuristic-based detection technologies. This process of modifying malware until the malware becomes undetectable is sometimes known as brute-force malware testing.

Malware that is undetectable to heuristic-based detection technologies may effectively undermine and/or cheapen security-software products that implement such heuristic-based detection technologies. The instant disclosure identifies a need, therefore, for a mechanism that frustrates the efforts of malware authors attempting to develop undetectable malware through brute-force malware testing.

SUMMARY

As will be described in greater detail below, the instant disclosure generally relates to systems and methods for alternating malware classifiers in an attempt to frustrate brute-force malware testing. More specifically, a security-software product developed in the manner described herein may alternate its use of unique but similarly accurate malware classifiers in order to frustrate the efforts of malware authors attempting to develop undetectable malware through brute-force malware testing.

In one example, one or more of the systems described herein may accomplish such a task by (1) providing a group of heuristic-based classifiers for detecting malware, with each classifier within the group differing from all other classifiers within the group but having an accuracy rate that is substantially similar to all other classifiers within the group, (2) including the group of classifiers within a security-software product, and then (3) alternating the security-software product's use of the classifiers within the group in an attempt to frustrate brute-force malware testing. In this example, the security-software product may alternate its use of the classifiers within the group by (1) randomly selecting and activating an initial classifier from within the group and then, upon completion of a select interval (such as a predetermined or random amount of time, a predetermined or random number of malware scans, a predetermined or random number of malware detections, or identification of a recurring event (e.g., startup of the security-software product)), (2) replacing the initial classifier with an additional classifier randomly selected from within the group.

The classifiers within the group may differ from one another in a variety of ways. For example, each classifier within the group may be configured to evaluate one or more file attributes that are different from file attributes evaluated by other classifiers within the group. Additionally or alternatively, each classifier within the group may contain one or more expressions that are different from expressions contained in other classifiers within the group. The file attributes evaluated by and/or expressions contained within a particular classifier may differ from those evaluated by and/or contained within other classifiers within the group based on the order in which these file attributes and/or expressions are evaluated and/or arranged, the total number of file attributes evaluated by and/or expressions contained within the classifier, and/or the identity of each file attribute evaluated by and/or expression contained within the classifier.

In some examples, the security-software product may replace the initial classifier with the additional classifier by (1) deactivating the initial classifier and then (2) activating the additional classifier. The security-software product may also continue alternating classifiers within the group in an attempt to further frustrate brute-force malware testing. For example, upon completion of an additional interval, the security-software product may replace the additional classifier with another, different classifier randomly selected from within the group. In some examples, the security-software product may represent a product capable of performing static and/or dynamic analyses of files and/or samples.

As will be described in greater detail below, by alternating among unique but substantially similarly accurate malware classifiers, the systems and methods described herein may frustrate the efforts of malware authors attempting to develop undetectable malware through brute-force malware testing, potentially decreasing the amount of harmful, undetectable malware distributed to computing devices. In addition, since the systems and methods described herein may be used on end-user computing devices to detect malware that has been modified through brute-force malware testing, these systems and methods may increase the value and effectiveness of security-software products for consumers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
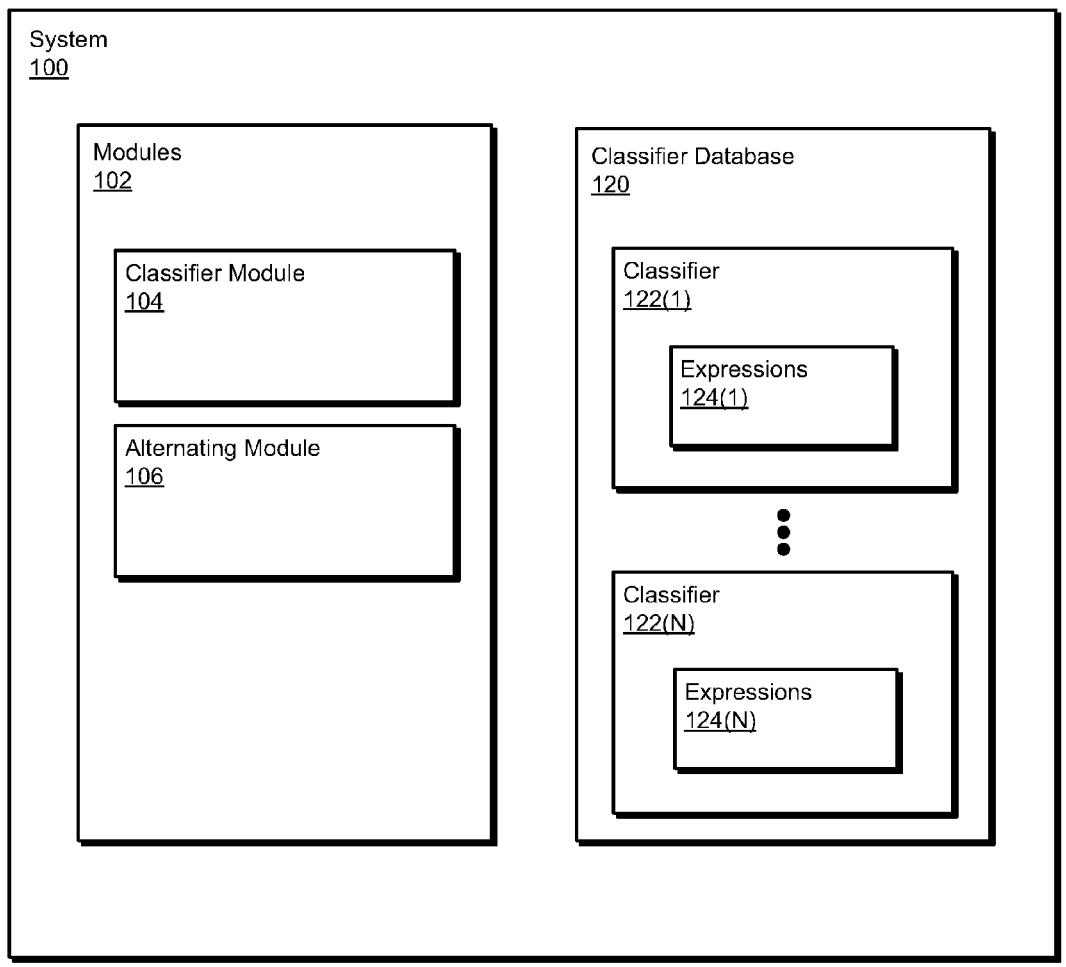
FIG. 1 is a block diagram of an exemplary system for alternating malware classifiers in an attempt to frustrate brute-force malware testing.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for alternating malware classifiers in an attempt to frustrate brute-force malware testing. The phrase "brute-force malware testing," as used herein, may refer to any process of (1) subjecting malware to a security-software product in order to determine whether the security-software product detects the malware and, if the security-product detects the malware, (2) modifying the malware until the malware becomes undetectable to the security-software product. Brute-force malware testing may involve subjecting the malware to the security-software product multiple times and/or modifying the malware multiple times in an attempt to render the malware undetectable to the security-software product. Malware authors may perform brute-force malware testing in specially designed malware testing facilities, and/or malware authors may create proprietary malware testing infrastructures that are used to perform brute-force malware testing.

Figure 2:
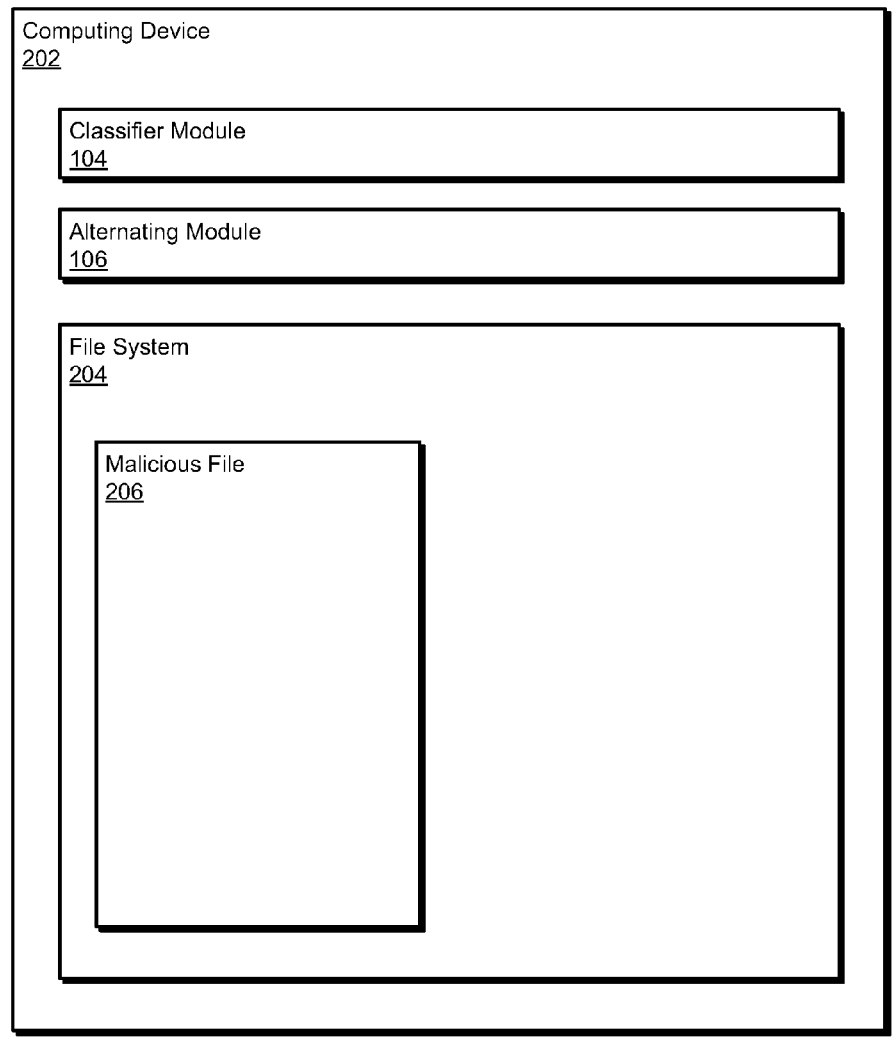
FIG. 2 is a block diagram of an exemplary system for alternating malware classifiers in an attempt to frustrate brute-force malware testing.
Figure 3:
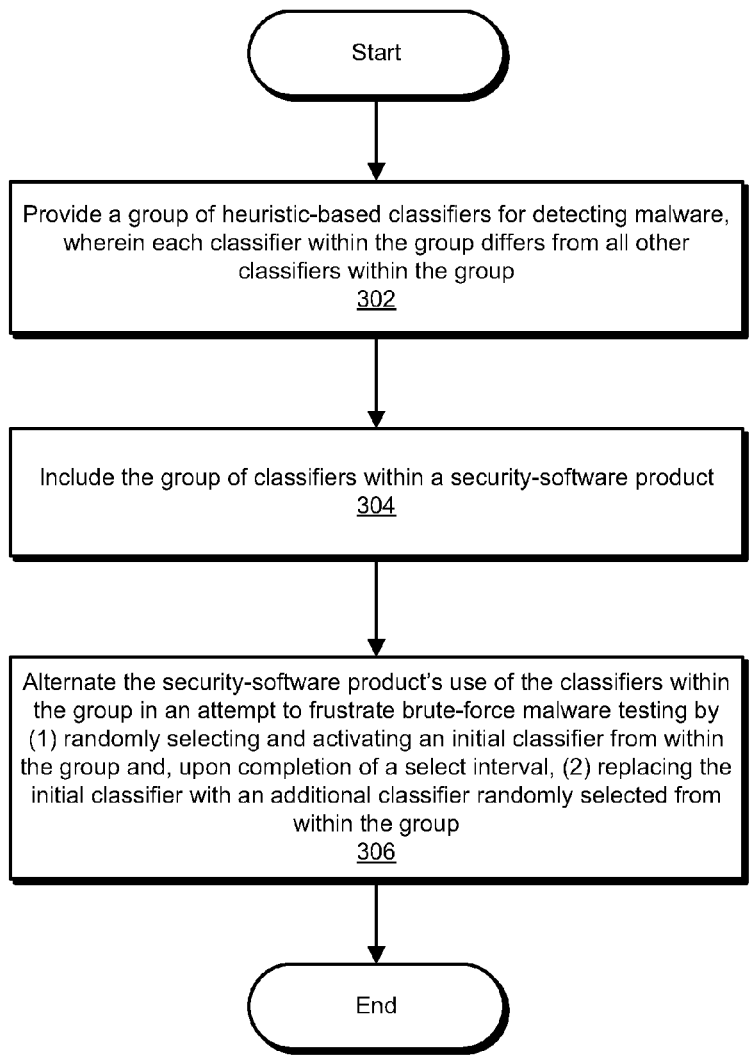
FIG. 3 is a flow diagram of an exemplary method for alternating malware classifiers in an attempt to frustrate brute-force malware testing.
Figure 4:
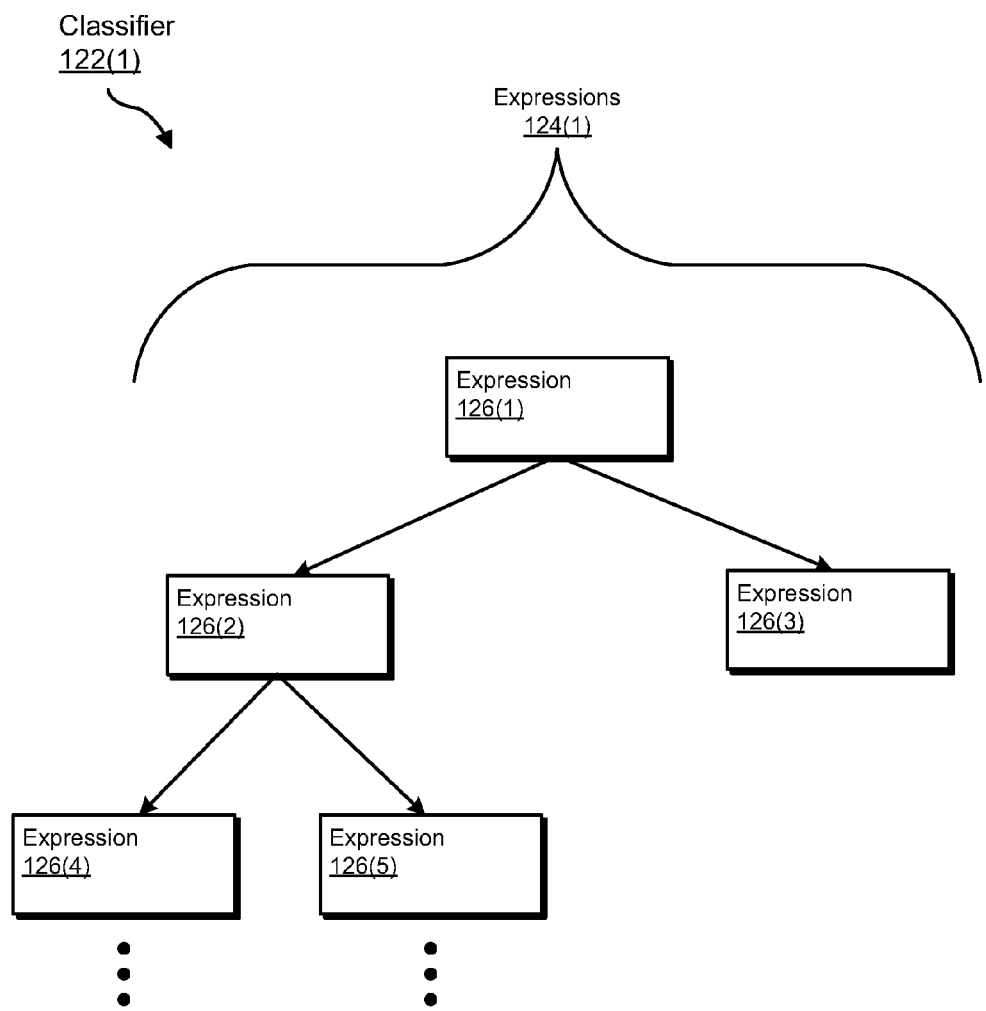
FIG. 4 is a block diagram of an additional exemplary system for alternating malware classifiers in an attempt to frustrate brute-force malware testing.

The following will provide, with reference to FIGS. 1-2 and 4, detailed descriptions of exemplary systems for alternating malware classifiers in an attempt to frustrate brute-force malware testing. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for alternating malware classifiers in an attempt to frustrate brute-force malware testing. As illustrated in this figure, exemplary system 100 may include one or more modules 102 for performing one or more tasks. For example, and as will be explained in greater detail below, exemplary system 100 may include a classifier module 104 programmed to (1) provide a group of heuristic-based classifiers for detecting malware, wherein each classifier within the group differs from all other classifiers within the group but has an accuracy rate that is substantially similar to all other classifiers within the group and (2) include the group of classifiers within a security-software product.

In addition, and as will be described in greater detail below, exemplary system 100 may include an alternating module 106 programmed to alternate the security-software product's use of the classifiers within the group in an attempt to frustrate brute-force malware testing by (1) randomly selecting and activating an initial classifier from within the group and, upon completion of a select interval, (2) replacing the initial classifier with an additional classifier randomly selected from within the group. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a classifier database 120. Classifier database 120 may represent portions of a single database or computing device or a plurality of databases or computing devices. In one embodiment, exemplary classifier database 120 may contain a plurality of classifiers 122(1)-(N) for detecting malware. Each of classifiers 122(1)-(N) may differ from one another but still have an accuracy rate that is substantially similar to one another. In addition, classifiers 122(1)-(N) may include expressions 124(1)-(4) that are configured to evaluate file attributes during malware scans.

Classifier database 120 in FIG. 1 may represent a portion of one or more computing devices. For example, classifier database 120 may represent a portion of computing device 202 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of computing device 202 in FIG. 2. As shown in FIG. 2, computing device 202 may include a file system 204 as well as classifier module 104 and alternating module 106.

In one embodiment, and as will be described in greater detail below, classifier module 104 and alternating module 106 may (as part of, e.g., a security-software program) cause computing device 202 to (1) identify or provide a group of heuristic-based classifiers (e.g., classifiers 122(1)-(N) in FIG. 1) for detecting malware, wherein each classifier within the group differs from all other classifiers within the group but has an accuracy rate that is substantially similar to all other classifiers within the group, (2) include the group of classifiers within a security-software product, and then (3) alternate the security-software product's use of the classifiers within the group in an attempt to frustrate brute-force malware testing by (a) randomly selecting and activating an initial classifier (e.g., classifier 122(1)) from within the group and then, upon completion of a select interval, (b) replacing the initial classifier with an additional classifier (e.g., classifier 122(N)) randomly selected from within the group.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

FIG. 3 is a flow diagram of an exemplary computer-implemented method 300 for alternating malware classifiers in an attempt to frustrate brute-force malware testing. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated at step 302 in FIG. 3, one or more of the systems described herein may identify or provide a group of heuristic-based classifiers for detecting malware, wherein each classifier within the group differs from all other classifiers within the group but has an accuracy rate that is substantially similar to all other classifiers within the group. For example, classifier module 104 may (as part of, e.g., a security-software product running on computing device 202) identify or provide classifiers 122(1)-(N) within classifier database 120. In this example, each of classifiers 122(1)-(N) may differ from one another but may have an accuracy rate that differs from the accuracy rates of all other classifiers within the group by no more than 0.01 to 0.03%.

The systems described herein may perform step 302 in a variety of ways. In one example, classifier module 104 may provide the group of heuristic-based classifiers by simply identifying the same. For example, classifier module 104 may retrieve classifiers 122(1)-(N) from a local database, such as classifier database 120, and/or receive classifiers 122(1)-(N) from a backend device or server. In other examples, classifier module 104 may provide the group of heuristic-based classifiers by generating the same. For example, classifier module 104 may generate or create classifiers 122(1)-(N) using any of a variety of known heuristic-creation techniques and/or technologies.

The phrase "heuristic-based classifier," as used herein, may refer to any generic malware-detection algorithm capable of detecting malware. Heuristic-based classifiers may include one or more expressions, similar to rules or conditional statements, configured to evaluate file attributes during malware scans. As will be explained in greater detail below, by applying the attributes of files to such expressions, a security-software product may determine whether files encountered during malware scans represent or contain malware.

As detailed above, each classifier identified or provided in step 302 may differ from one another (i.e., each classifier within the group may be unique). These classifiers may differ from one another in a variety of ways. For example, each classifier within the group may differ from all other classifiers within the group based on the file attributes evaluated by the classifier and/or the expressions contained within the classifier.

The file attributes evaluated by and/or expressions contained within a classifier may differ from those evaluated by and/or contained within all other classifiers within the group in a variety of ways. For example, the file attributes evaluated by and/or expressions contained within a particular classifier may differ from those evaluated by and/or contained within all other classifiers within the group based on the order in which these file attributes and/or expressions are evaluated and/or arranged, the total number of file attributes evaluated by and/or expressions contained within the classifier, and/or the identity of each file attribute evaluated by and/or expression contained within the classifier.

For example, classifier 122(1) within classifier database 120 in FIG. 1 may contain expressions 124(1) for evaluating, in this order, (1) the size, (2) the name, and (3) the location of each file encountered during a malware scan. In the same example, classifier 122(N) within classifier database 120 may contain expressions 124(N) for evaluating, in this order, (1) the location, (2) the extension, and (3) the size of each file encountered during a malware scan in addition to (4) the number of functions imported by each file.

As detailed above, the identity of the attributes evaluated by and/or expressions contained within the classifiers may also vary. For example, each of classifiers 122(1)-(N) within classifier database 120 may be configured to evaluate at least one file attribute that is different from the file attributes evaluated by all other classifiers within the group. For example, classifier 122(1) within classifier database 120 may be configured to evaluate, during a malware scan, (1) the size, (2) the name, and (3) the location of each file within file system 204 of computing device 202, while classifier 122(N) may be configured to evaluate (1) the size and (2) the extension of each file within file system 204 and (3) the number of functions imported by each file.

Similarly, each of classifiers 122(1)-(N) within classifier database 120 may contain at least one expression that is different from the expressions contained within all other classifiers within the group. For example, and as illustrated in FIG. 4, classifier 122(1) within classifier database 120 may contain expressions 124(1) that classify a file as malware if (1) the size of the file is less than 10 megabytes (e.g., expression 126(1)), (2) the name of the file includes character sequence "XYZ" (e.g., expression 126(2)), and (3) the file is located at path "C:\WINDOWS\System32\Drivers\ETC\HOSTS" (e.g., expression 126(4)), while classifier 122(N) may contain expressions 124(N) that classify a file as malware if (1) the file is less than 10 megabytes, (2) the file extension is .EXE, and (3) the file imports more than 20 functions.

As the above examples illustrate, classifiers 122(1)-(N) within classifier database 120 may be configured to evaluate one or more of the same file attributes and/or contain one or more of the same expressions as other classifiers within the group. Examples of file attributes that may be evaluated by such classifiers and/or included within expressions include, without limitation, the size of a file, the name of a file, the location of a file, the extension of a file, the number of functions imported by a file, whether a file generate visible windows, whether a file generates network traffic, or any other suitable file attributes.

As detailed above, although each classifier within the group provided in step 302 may differ from all other classifiers within the group, each classifier within the group may have an accuracy rate or level that is substantially similar to the accuracy rates of all other classifiers within the group. For example, each of classifiers 122(1)-(N) in FIG. 1 may differ from one another but may have an accuracy rate that differs from the accuracy rates of all other classifiers within the group by no more than 0.01 to 0.03%.

Returning to FIG. 3, at step 304 one or more of the systems described herein may include the group of classifiers within a security-software product. For example, classifier module 104 may include classifiers 122(1)-(N) as part of an anti-malware solution (such as NORTON ANTIVIRUS) installed on computing device 202. Examples of security-software products include, without limitation, anti-malware solutions such as antivirus software, anti-spyware software, anti-adware software, or any other suitable security-software products. In some examples, the security-software product may represent a product capable of performing static and/or dynamic analyses of files and/or samples.

The systems described herein may perform step 304 in a variety of ways. In some examples, a software publisher may include the group of classifiers within a security-software product prior to deploying the same. In other examples, the software publisher may provide the group of classifiers to the security-software product post-deployment (i.e., the security-software product may retrieve the group of classifiers from a backend device or server after having been installed on a user's device).

At step 306 in FIG. 3, one or more of the systems described herein may alternate the security-software product's use of the classifiers within the group in an attempt to frustrate brute-force malware testing by (1) randomly selecting and activating an initial classifier from within the group and then, upon completion of a select interval, (2) replacing the initial classifier with an additional classifier randomly selected from within the group. For example, alternating module 106 may, as part of a security-software product running on computing device 202, alternate the security-software product's use of classifiers 122(1)-(N) in an attempt to frustrate brute-force malware testing by (1) randomly selecting and activating an initial classifier (e.g., classifier 122(1)) from classifier database 120 and then, upon completion of a predetermined or random amount of time, (2) replacing the initial classifier (classifier 122(1)) with another randomly selected classifier (e.g., classifier 122(N)). Upon completion of step 306 in FIG. 3, exemplary method 300 may terminate.

The systems described herein may cause a security-software product to alternate its use of the classifiers provided in step 302 in a variety of ways. In one example, these systems may cause the security-software product to alternate between classifiers at various intervals. For example, alternating module 106 may alternate or rotate a security-software product's use of a particular classifier upon completion of a predetermined or random amount of time, upon completion of a predetermined or random number of malware scans, upon detecting a predetermined or random number of items of malware, and/or upon identification of a recurring event (such as startup of the security-software product).

For example, alternating module 106 may, as part of a security-software product running on computing device 202, randomly select and activate an initial classifier (e.g., classifier 122(1)) from classifier database 120 for use during malware scans. Later, upon completion of a select interval (such as upon completion of a predetermined or random amount of time), alternating module 106 may cause the security-software product to replace the initial classifier (classifier 122(1)) with another classifier (e.g., classifier 122(N)) randomly selected from classifier database 120 (by, e.g., deactivating classifier 122(1) and activating classifier 122(N)).

In some examples, the security-software product may continue alternating among classifiers within classifier database 120 in an attempt to further frustrate brute-force malware testing. For example, upon completion of an additional interval (such as upon detecting a predetermined or random number of items of malware), the security-software product may replace classifier 122(N) with another randomly selected classifier (e.g., classifier 122(4)).

The following will provide an example of how a security-software product's alternating use of unique (but substantially similarly accurate) classifiers may frustrate a malware author's attempt to develop undetectable malware through brute-force malware testing. In this example, a malware author may attempt to modify a malicious file 206 using brute-force testing until the file becomes undetectable to a security-software product running on computing device 202 in FIG. 2. The security-software product in this example may, however, be configured to alternate among unique (but substantially similarly accurate) classifiers at various intervals, such as upon the completion of a predetermined (e.g., every 12 hours) or random period of time, in accordance with the systems and methods described herein.

In this example, malicious file 206 may (1) be less than 10 megabytes in size, (2) contain the sequence "XYZ" within its file name, (3) be located at path "C:\WINDOWS\System32\Drivers\ETC\HOSTS," (4) end with the extension ".EXE," (5) import more than 20 functions, and (6) generate network traffic without (7) generating visible windows. The malware author may begin by subjecting malicious file 206 to a malware scan performed by the security-software product running on computing device 202 in order to determine whether the security-software product correctly classifies malicious file 206 as malware. When performing this malware scan, alternating module 106 may cause the security-software product running on computing device 202 to randomly select and activate an initial classifier (e.g., classifier 122(1)). In this example, classifier 122(1) may classify a file as malware if (1) the size of the file is less than 10 megabytes, (2) the name of file includes the sequence "XYZ," and (3) the file is located at the path "C:\WINDOWS\System32\Drivers\ETC\HOSTS." As such, during this scan, classifier 122(1) may correctly classify malicious file 206 as malicious since (1) the size of malicious file 206 is less than 10 megabytes, (2) the name of malicious file 206 includes the sequence "XYZ," and (3) malicious file 206 is located at path "C:\WINDOWS\System32\Drivers\ETC\HOSTS."

Upon determining that the security-software product correctly classified malicious file 206 as malware, the malware author may attempt to modify (using, e.g., brute-force testing techniques) various properties and/or attributes of malicious file 206 (such as the size, file name, and/or file path of malicious file 206) until malicious file 206 is no longer classified as malware by the security-software product (which, as explained above, is currently utilizing classifier 122(1)). However, even if the malware author is able to temporarily render malicious file 206 undetectable to the security-software product, the security-software product may, upon completion of a select interval (such as upon completion of a predetermined or random amount of time or upon completion of a predetermined or random number of malware scans), frustrate the malware author's efforts by replacing classifier 122(1) with another randomly selected classifier that classifies files based upon a unique set of attributes and/or expressions.

For example, 12 hours after first randomly selecting and activating classifier 122(1), alternating module 106 may cause the security-software product to replace classifier 122(1) with another randomly selected classifier by randomly selecting and activating classifier 122(N). In this example, classifier 122(N) may classify files based on whether a file (1) generates network traffic without (2) generating visible windows. As such, even if the malware author was able to render (through brute-force testing) malicious file 206 undetectable to classifier 122(1), classifier 122(N) may still classify malicious file 206 as malware if malicious file 206 still generates network traffic without generating a visible window, thereby frustrating the malware author's efforts.

Alternating module 106 may continue to impede the malware author's efforts by continually alternating classifiers at various intervals. For example, upon completion of an additional interval (such as upon restart of the security-software product), alternating module 106 may again cause the security-software product to replace classifier 122(N) with another randomly selected classifier that classifies files based upon a unique set of attributes and/or expressions. For example, alternating module 106 may randomly select and activate classifier 122(2), which classifier may classify a file as malicious if the file (1) is less than 10 megabytes in size, (2) ends with the extension ".EXE," and (3) imports more than 20 functions. As such, even if the malware author was able to again render (through brute-force testing) malicious file 206 temporarily undetectable to the security-software product during the small period of time during which classifier 122 (N) was utilized, the security-software product may still classify malicious file 206 as malware upon replacing classifier 122(N) with classifier 122(2) if malicious file 206 still (1) is less than 10 megabytes in size, (2) ends with the extension ".EXE," and (3) imports more than 20 functions.

As is clear from the above example, by randomly alternating a security-software product's use of unique (but substantially similarly accurate) classifiers, the systems and methods described herein may frustrate or impede a malware author's attempt to render malware undetectable through brute-force testing since (1) the malware author may be unaware that the security-software product utilizes and alternates through more than one classifier, (2) even if the malware author is aware of this fact, the malware author may be unable to identify the classifier that has been randomly selected and activated by the security-software product, (3) even if the malware author is able to identify the classifier that has been randomly selected and activated by the security-software product, the malware author may be unable to determine how long the security-software product will use this classifier before replacing the same with another randomly selected classifier, and (4) even if the malware author is able to render the malware temporarily undetectable to the security-software product at one point in time, the security-software product may still detect the malware at a subsequent point in time upon randomly selecting and activating an additional, unique classifier. As such, the systems and methods described herein may render the use of brute-force testing unfeasible, impractical, and/or unreliable.

In some examples, while the systems described herein may help decrease the amount of harmful, undetectable malware distributed to computing devices, a malware author may mistakenly believe that the author has successfully rendered (using brute-force testing) an item of malware undetectable to a security-software product when, in reality, the malware has merely been rendered undetectable to less than all of the classifiers utilized by the security-software product. In this example, the malware author may distribute the brute-force modified item of malware upon determining that the item of malware has been rendered (temporarily) undetectable to the security-software product. However, even identical versions of the security-software product may detect the item of malware in the field since this item of malware has only been rendered undetectable to a subset of the classifiers utilized by the security-software product.

As described above, by alternating among unique but substantially similarly accurate malware classifiers, the systems and methods described herein may frustrate the efforts of malware authors attempting to develop undetectable malware through brute-force malware testing, potentially decreasing the amount of harmful, undetectable malware distributed to computing devices. In addition, since the systems and methods described herein may be used on end-user computing devices to detect malware that has been modified through brute-force malware testing, these systems and methods may increase the value and effectiveness of security-software products for consumers.

Figure 5:
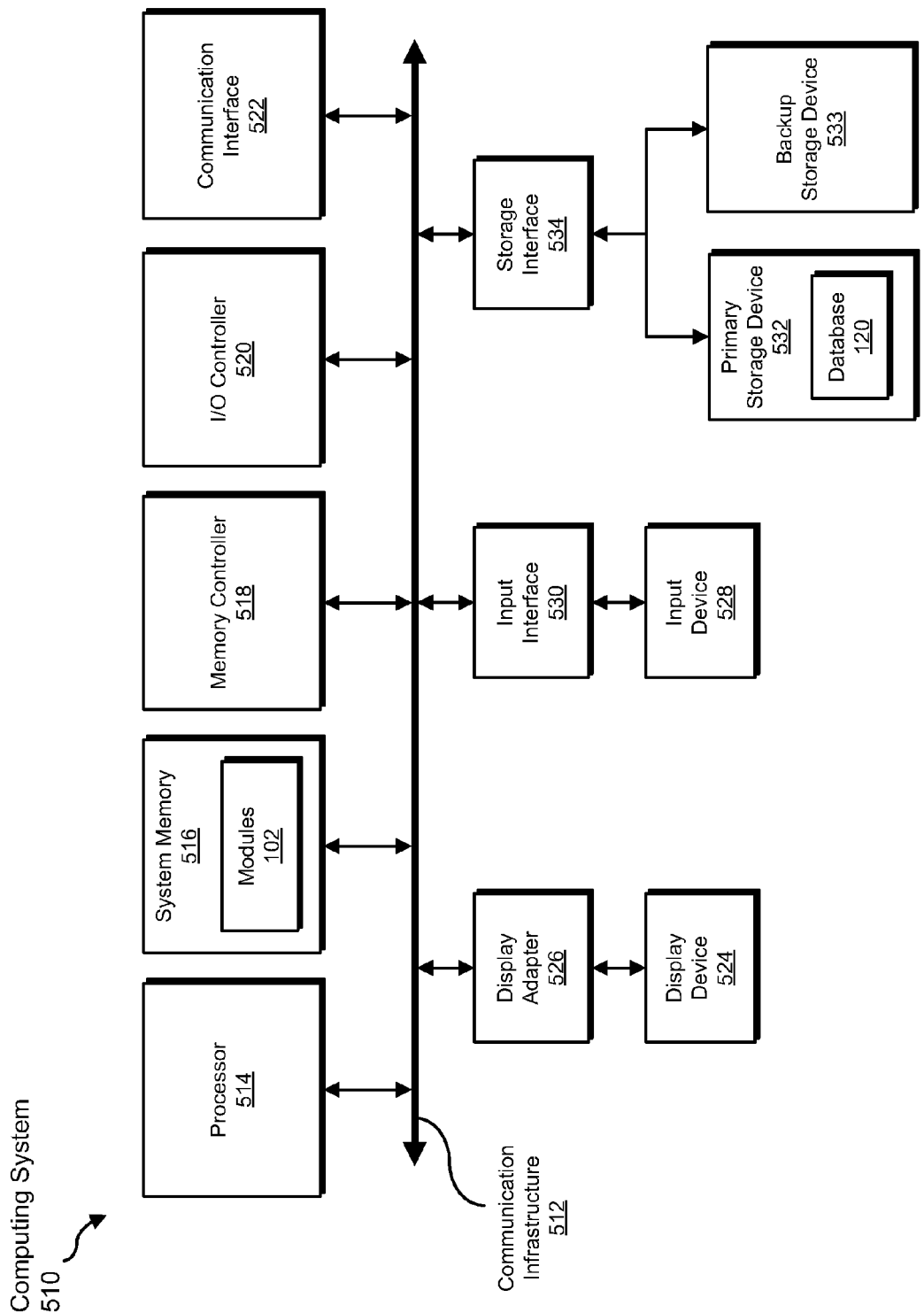
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the providing, including, alternating, selecting, activating, replacing, deactivating, and activating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as providing, including, alternating, selecting, activating, replacing, deactivating, and activating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the providing, including, alternating, selecting, activating, replacing, deactivating, and activating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the providing, including, alternating, selecting, activating, replacing, deactivating, and activating steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the providing, including, alternating, selecting, activating, replacing, deactivating, and activating steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the providing, including, alternating, selecting, activating, replacing, deactivating, and activating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
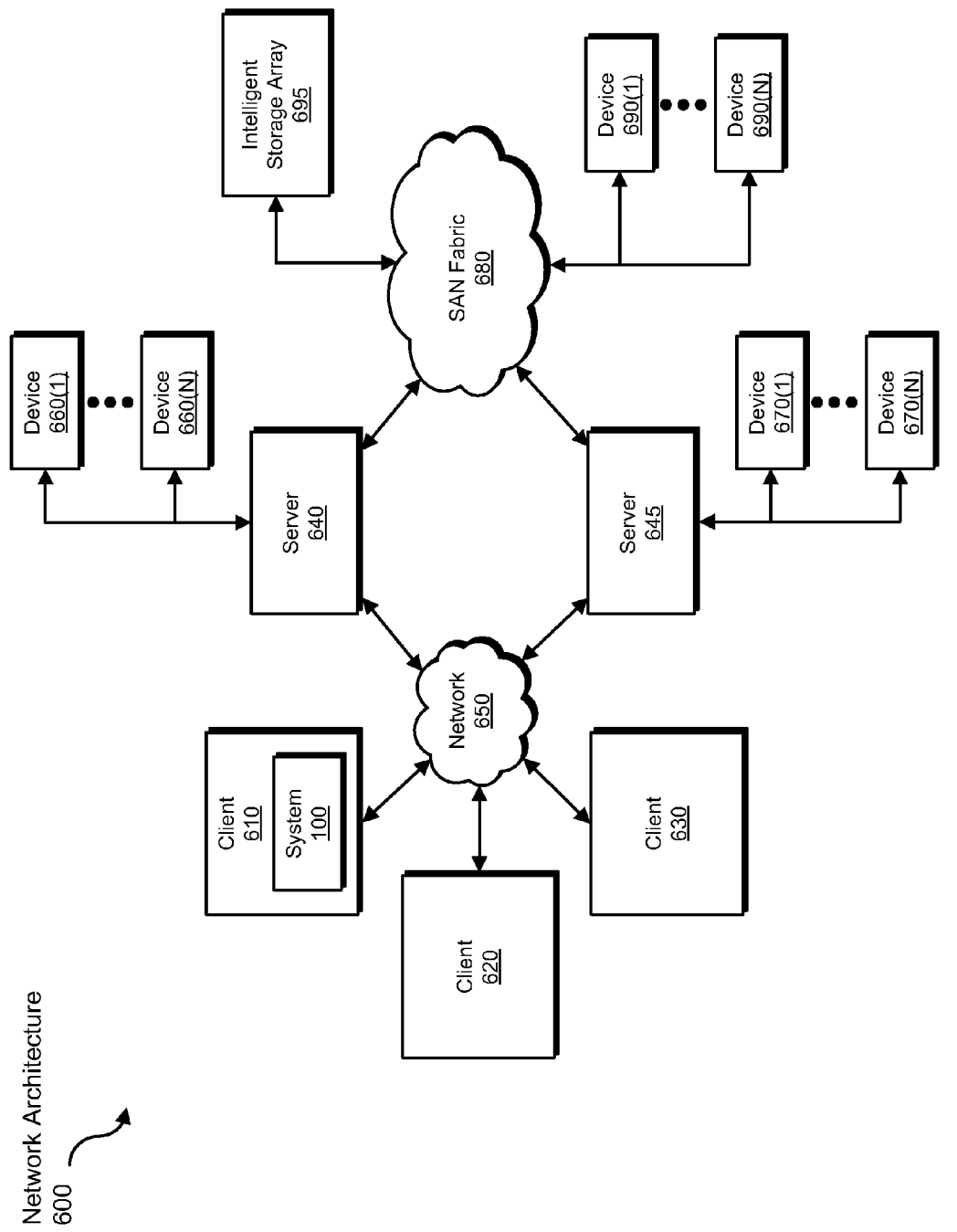
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the providing, including, alternating, selecting, activating, replacing, deactivating, and activating steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for alternating malware classifiers in an attempt to frustrate brute-force malware testing.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a property or characteristic of computing device 202 in FIG. 2 by causing a security-software product running on the same to alternate among unique but substantially similarly accurate heuristic-based malware classifiers.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for alternating malware classifiers in an attempt to frustrate brute-force malware testing, at least a portion of the method being performed by a computing device comprising at least one processor, the method comprising:
providing a group of heuristic-based classifiers for detecting malware, wherein each classifier within the group differs from all other classifiers within the group but has an accuracy rate that is substantially similar to all other classifiers within the group;
including the group of classifiers within a security-software product;
alternating the security-software product's use of the classifiers within the group in an attempt to frustrate brute-force malware testing by:
randomly selecting and activating an initial classifier from within the group;
performing a plurality of malware scans with the activated initial classifier;
after performing the plurality of malware scans with the activated initial classifier, detecting completion of a select interval;
upon detecting completion of the select interval, replacing the initial classifier with an additional classifier randomly selected from within the group;
upon completion of an additional interval, replacing the additional classifier with another classifier randomly selected from within the group.

2. The method of claim 1, wherein each classifier within the group differs from all other classifiers within the group by at least one of:
attributes evaluated by the classifier;
expressions contained within the classifier.

3. The method of claim 2, wherein the attributes and expressions differ by at least one of:
order;
number;
identity.

4. The method of claim 1, wherein the interval comprises at least one of:
a predetermined amount of time;
a random amount of time;
a predetermined number of malware scans;
a random number of malware scans;
a predetermined number of malware detections;
a random number of malware detections;
identification of a recurring event.

5. The method of claim 4, wherein the recurring event comprises startup of the security-software product.

6. The method of claim 1, wherein replacing the initial classifier with the additional classifier comprises:
deactivating the initial classifier;
activating the additional classifier.

7. The method of claim 1, wherein the security-software product performs at least one of:
static analysis of samples;
dynamic analysis of samples.

8. A system for alternating malware classifiers in an attempt to frustrate brute-force malware testing, the system comprising:
a classifier module programmed to:
provide a group of heuristic-based classifiers for detecting malware, wherein each classifier within the group differs from all other classifiers within the group but has an accuracy rate that is substantially similar to all other classifiers within the group;
include the group of classifiers within a security-software product;
an alternating module programmed to alternate the security-software product's use of the classifiers within the group in an attempt to frustrate brute-force malware testing by:
randomly selecting and activating an initial classifier from within the group;
performing a plurality of malware scans with the activated initial classifier;
after performing the plurality of malware scans with the activated initial classifier, detecting completion of a select interval;
upon detecting completion of the select interval, replacing the initial classifier with an additional classifier randomly selected from within the group;
upon completion of an additional interval, replacing the additional classifier with another classifier randomly selected from within the group;
at least one hardware processor programmed to execute the classifier module and the alternating module.

9. The system of claim 8, wherein each classifier within the group differs from all other classifiers within the group by at least one of:
   attributes evaluated by the classifier;
   expressions contained within the classifier.

10. The system of claim 9, wherein the attributes and expressions differ by at least one of:
   order;
   number;
   identity.

11. The system of claim 8, wherein the interval comprises at least one of:
   a predetermined amount of time;
   a random amount of time;
   a predetermined number of malware scans;
   a random number of malware scans;
   a predetermined number of malware detections;
   a random number of malware detections;
   identification of a recurring event.

12. The system of claim 11, wherein the recurring event comprises startup of the security-software product.

13. The system of claim 8, wherein the alternating module replaces the initial classifier with the additional classifier by:
   deactivating the initial classifier;
   activating the additional classifier.

14. The system of claim 8, wherein the security-software product performs at least one of:
   static analysis of samples;
   dynamic analysis of samples.

15. A non-transitory computer-readable-storage medium comprising one or more computer-executable instructions that, when executed by at least one processor of a computing device, cause the computing device to:
   provide a group of heuristic-based classifiers for detecting malware, wherein each classifier within the group differs from all other classifiers within the group but has an accuracy rate that is substantially similar to all other classifiers within the group;
   include the group of classifiers within a security-software product;
   alternate the security-software product's use of the classifiers within the group in an attempt to frustrate brute-force malware testing by:
      randomly selecting and activating an initial classifier from within the group;
      performing a plurality of malware scans with the activated initial classifier;
      after performing the plurality of malware scans with the activated initial classifier, detecting completion of a select interval;
      upon detecting completion of the select interval, replacing the initial classifier with an additional classifier randomly selected from within the group;
      upon completion of an additional interval, replacing the additional classifier with another classifier randomly selected from within the group.

16. The computer-readable-storage medium of claim 15, wherein each classifier within the group differs from all other classifiers within the group by at least one of:
   attributes evaluated by the classifier;
   expressions contained within the classifier.

17. The computer-readable-storage medium of claim 16, wherein the attributes and expressions differ by at least one of:
   order;
   number;
   identity.

\* \* \* \* \*